United States Patent [19]

East

[11] 3,879,727

[45] Apr. 22, 1975

[54] DIGITAL DATA HANDLING SYSTEM

[75] Inventor: Peter William East, Felbridge, near East Grinstead, England

[73] Assignee: U.S. Philips Corporation, New York, N.Y.

[22] Filed: Oct. 15, 1973

[21] Appl. No.: 406,375

[30] Foreign Application Priority Data

Oct. 16, 1972 United Kingdom .............. 47583/72

[52] U.S. Cl. ............ 343/5 DP; 328/109; 343/5 SA; 343/18 E; 340/146.2

[51] Int. Cl. ............................................ G01s 9/02

[58] Field of Search ............. 343/18 E, 5 SA, 5 DP; 328/109, 137

[56] References Cited

UNITED STATES PATENTS

| | | | |
|---|---|---|---|
| 3,484,704 | 12/1969 | Hungerford | 328/137 |
| 3,720,952 | 3/1973 | Lawsine | 343/18 E |
| 3,721,905 | 3/1973 | Newman et al. | 328/109 |
| 3,764,999 | 10/1973 | Simons et al. | 343/18 E |

*Primary Examiner*—Maynard R. Wilbur
*Assistant Examiner*—G. E. Montone
*Attorney, Agent, or Firm*—Frank R. Trifari; George B. Berka

[57] ABSTRACT

A system for selectively storing parallel trains of digital information produced in a converter from a plurality of received signals, comprises a plurality of stores arranged in parallel storing channels, a plurality of comparators connected between a pair of stores and between corresponding outputs of the converter to ascertain coincidence between received and stored information, counting circuits for registering each match in respective comparators, and preference logic circuits for resetting all stores except the ones at which a match occurs.

4 Claims, 3 Drawing Figures

DIGITAL DATA HANDLING SYSTEM

The present invention relates to a digital data handling system and more particularly to a system in which a large number of digital input pulses are received and which require sorting.

The present invention finds particular application in the field of radar receivers in which a radar receiver, receives a large number of incoming signals from various radar stations and converts these incoming signals into digital signals representing the frequency, bearing, pulse width etc. of each particular signal received from a respective radar transmitter. In any particular application a pulse repetition frequency of 1 KHz and up to 100 sets of incoming signals can be expected. Each incoming signal is converted into approximately 35 digital bits therefore the bit repetition rate expected from the analogue to digital converter can be 3.5 megabits per second. Such a repetition rate would overload the normal computer storage techniques and therefore it is an object of the present invention to provide adequate data sorting for such a large number of incoming signals.

According to the present invention there is provided a digital data handling system including a plurality of store groups serving a number of channels of information, in which related signals are fed into the stores of a corresponding group, including a comparing circuit which establishes correlation between an input signal and stored data, in which when a correlation is established between a further series of input signals and the stored signals a counter is stepped forward one position, and in which preference logic is provided to ensure that a particular set of data is stored in only one store group, such that the input information is self sorting.

An embodiment of the present invention will now be described, by way of example, with reference to the accompanying drawings, in which.

Figure 1:
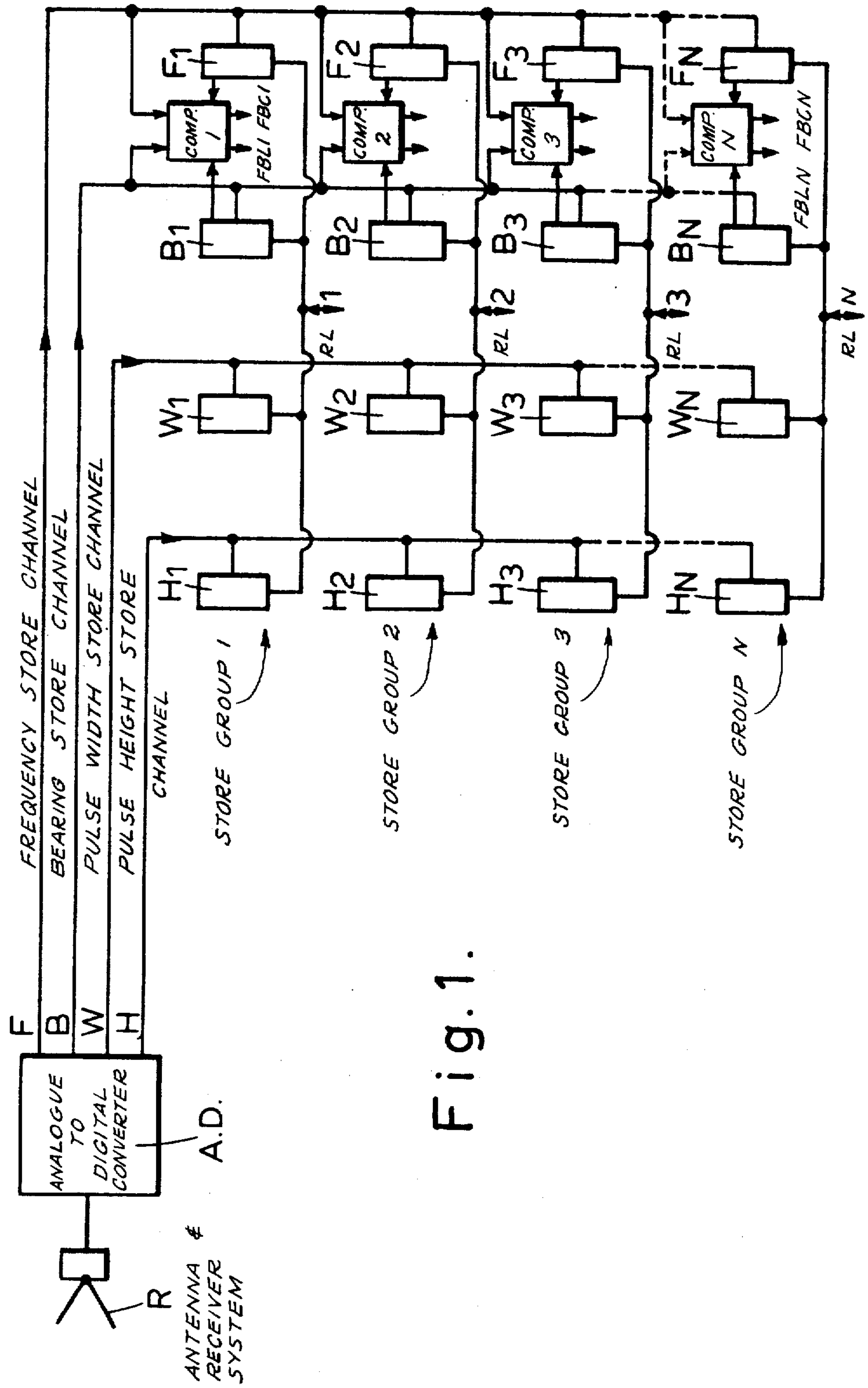
FIG. 1 shows a data storegin system incorporating the present invention.

Referring now to FIG. 1, there is shown an aerial and receiver system R which receives a large number of signals. Particularly the aerial and receiver system R is designed to receive and to sort signals from radar stations, either stationary or moving. The aerial is omnidirectional and receives signals at a large number of frequencies over a given range.

Signals from the aerial and receiver system R are fed to an analogue to digital converter AD. The output of the analogue to digital converter AD is in parallel form and may consist of several parallel channels each one of which may have several parallel outputs. In a particular example chnnels F. B. W. and H are provided each with 10 separate parallel outputs. The digital signals on channel F may represent a measurement of frequency, the signals on channel B. a measurement of the bearing of a radar set, the signals on channel W. a measure of the width of the received pulse and the signals on channel H the height or size of the received pulse.

Considering firstly channel F the digital pulses are fed in parallel to a number of stores F1 - FN. Similarly the pulses on channels B. W. and H. are fed to respective stores B1 to BN, W1 - WN and H1- HN.

When an input pulse from a distant radar set is received at the aerial and receiver system R the information of the frequency, bearing, pulse width, and pulse height is fed from the aerial system and associated receiver to the analogue to digital converter A-D. The frequency, bearing, pulse width and pulse height are then obtainable on the outputs of AD in a digital form. The frequency is fed in digital form in parallel to all the stores F1 - FN and similarly the bearing, pulse width and pulse height are fed in digital form to the respective stores B1 - BN; W1 - WN and H1 - HN. Hence if all the so stores F1 - FN are initially empty they will then receive and store the same information i.e., the frequency of the particular radar station detected, in digital form.

Figure 2:
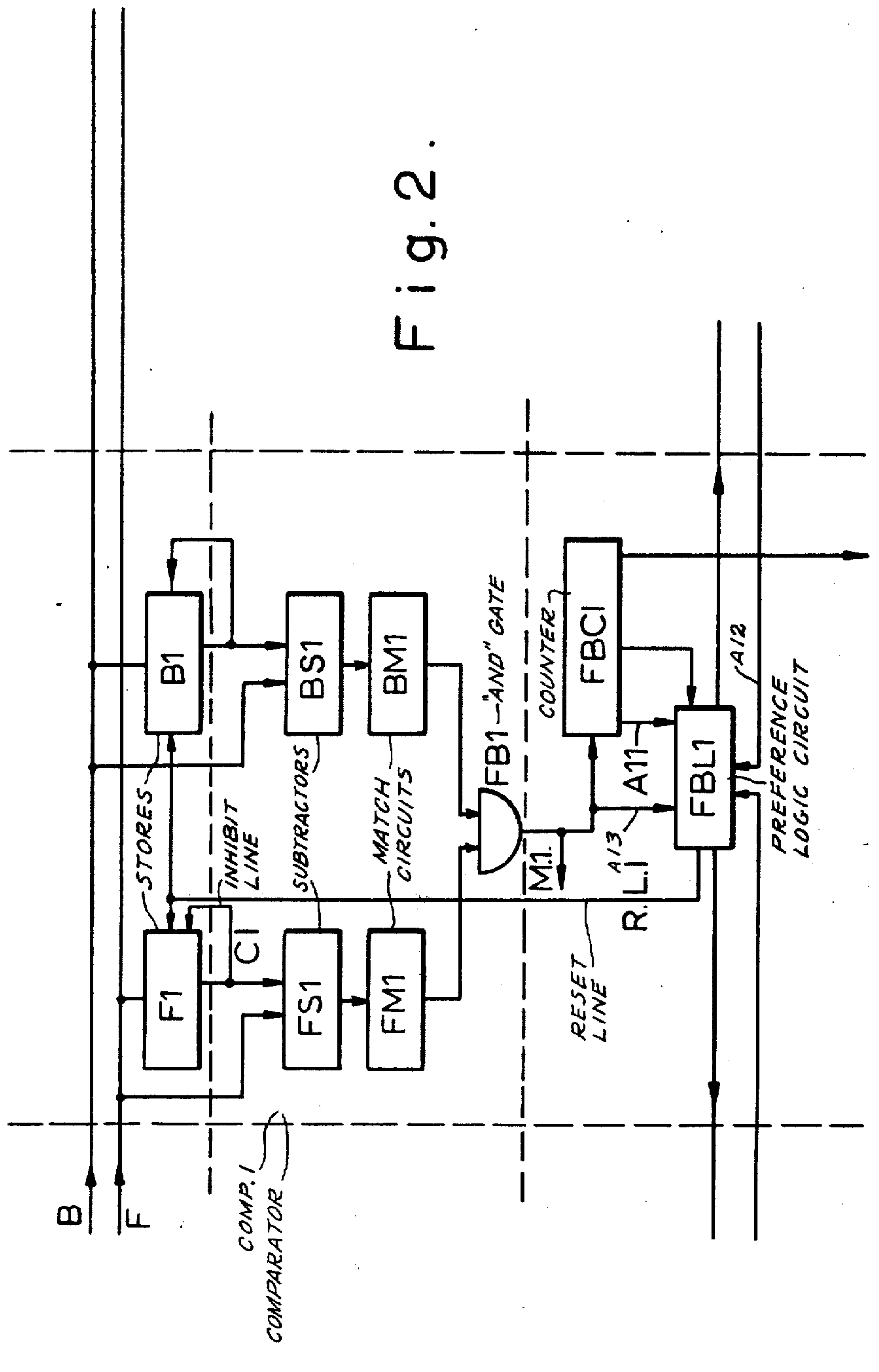
FIG. 2 shows in more detail a comparator of FIG. 1.

Referring now to FIG. 2 showing a comparing circuit for two stores in a store group, for simplicity, only two of the outputs of AD are shown, these being F and B channels representing the frequency and bearing of the received pulse from a distant radar set. Only stores F1 and B1 are shown in order to simplify the explanation. The lines F and B continue as in FIG. 1 to feed the further stores F2 - FN and B2 - BN. The contents of the store F1 are fed in parallel to one input of a subtractor FS1. The other input of the subtractor is connected directly to the output F of the analogue to digital converter A - D. The output of the subtractor is connected to a matching circuit FM1 the output of which is fed to an AND gate FB1. The output of AND gate FB1 is fed to a counter FBC1 and to a preference logic circuit FBL1. The input information on channel B is fed to a store B1 and also to a subtractor BS1 to which also the output of the store B1 is connected. The output of subtractor BS1 is fed to a matching circuit BM1, the output of which is fed to a second input of AND gate FB1.

When a signal is received on the aerial and receiver system R and fed to the analogue to digital converter AD the digital signals are produced on the outputs, F, B, W and H. The output signal on channel F is in the form of 10 parallel digits. These digits are stored in the previously empty stores F1 to FN. When the store F1 is filled the output from the store F1 provides a clock inhibit via line CI which prevents any further information being stored in the store F1 until after a reset pulse is received along the reset line RL. The instantaneously stored information in store F1 is compared with itself in the subtactor FS1, the output of FS1 therefore being zero. The matching circuit FM1 therefore records that a match between these two signals has been obtained and provides an input to AND gate FB1. Similarly the data on channel B is stored in store B1 and compared with itself in subtractor BS1, matching circuit BM1 providing a second input to AND gate FB1. Therefore AND gate FB1 provides an output which advances the counter FBC1 by one position. The matching circuits FM1 and BM1 can be set such that an output is given when the signal stored in stores F1 or B1 is equal to any signal received along lines F and B or when any signal is received along lines F or B which is within a certain tolerance of the stored value.

If all the stores F1 to FN were empty then they will all have stored information given by the first set of parallel pulses along the line F. Since it is desired to store this information in only one store, for example F1, a preference logic is provided which resets all stores except the one in which it is desired to store information.

The operation of this preference logic will be described hereinafter with reference to FIG. 3.

It is anticipated that numerous signals will arrive at the aerial and receiver system R and will be subsequently transferred in digital form to the stores F1 to FN. If the second signal received is of a different frequency to the value stored in F1 the subtractor FS1 will give a large output and the matching circuit FM1 will not record a match. This second signal will therefore be stored in a further store for example store F2. This process will be continued until a signal is received which is of the same frequency as the value stored in store F1. When such a signal is received the subtractor FS1 will give either a zero or a small output within the tolerance range of the matching circuit FM1 and the matching circuit FM1 will give an output 1 to an input of the AND gate FB1. If the signal has been received from the same radar station as the previous information stored in F1 and B1 then the bearing received on line B will also provide a match and a further input will be provided for AND gate FB1 thus setting the counter FBC1 forward one more position. If the second series of information is also stored in a further store, for example FN, this store will be reset by the preference circuit FBLN associated with that particular store so that only one store is used to store the information.

After several minutes the counters FBC1 . . . FBCN will have counts of varying numbers depending on a repetition frequency of each incoming pulse from the various radar transmitters. The information of frequency, bearing and pulse repetition frequency is therefore readily obtainable by reading the stores $F_1$, $B_1$ and FBC1 in the case of the first radar transmitter and FN BN and FBCN in the case of the Nth radar transmitter.

Figure 3:
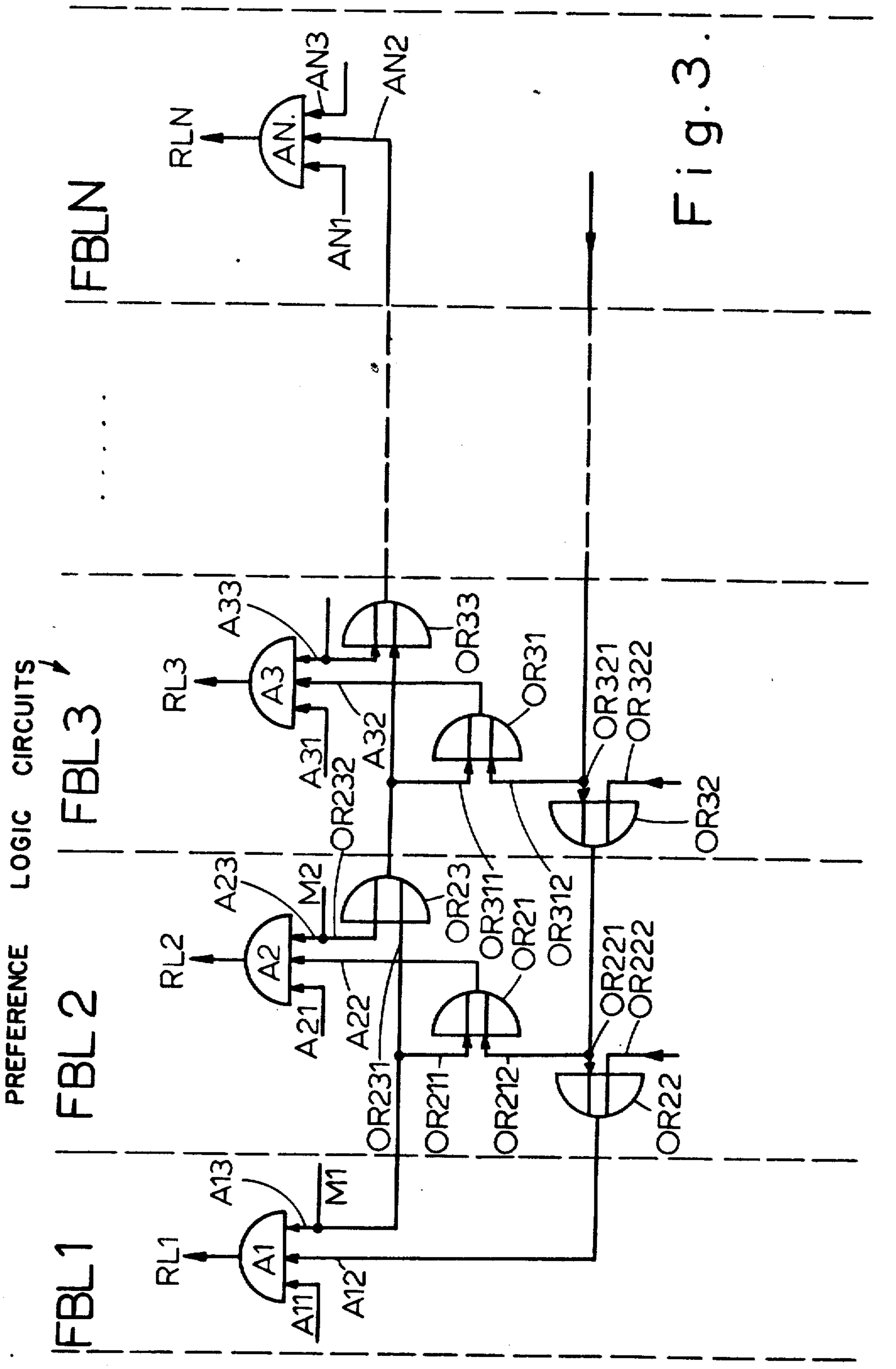
FIG. 3 shows the preference logic used in the arrangement of FIG. 1.

Referring now to FIG. 3 the preference logic circuits pertaining to respective store groups channels of input information are referenced FBL1, FBL2, FBL3 . . . FBLN. Therefore circuit FBLN will serve to reset stores FN, BN, WN, and HN. The preference circuitry FBL 1 contains only an AND gate A1 with three inputs A11 to A13. The first input signal at A11 is present when there is a count of 1 in the counter FBC1, the second input signal at A12 is present when one of the counters in the higher numbered groups has a count of greater than 1 and the third input signal at A13 occurs when a match has been recorded on comparator 1.

The preference circuitry FBL 2 includes an AND gate A2 with three inputs A21, A22 and A23. Input signal at A21 is present when there is a count of 1 in the counter C2; input signal at A22 is present when the OR gate OR21 gives an output and input signal at A23 is present when there is a match on comparator 2.

The OR gate OR 21 has two inputs, one from the comparator 1 match signal source M1, and one from the output of OR 32 in counter of a 3 which gives an output when any channel higher number than counter 2 has a count greater than 1.

OR gate 22 has two inputs, on OR 221 the output of OR 32 and on OR 222 the output of the counter of channel 2 when the counter has a reading greater than 1. OR gate OR 22 gives an output when either counter 2 or any counter with a higher number has a count greater than 1.

OR gate OR 23 has two inputs, OR 231 from the match signal source M1 of comparator 1 and OR 232 from the match signal source M2 of comparator 2. OR gate 23 therefore gives an output when either comparator 2 or any comparator with a lower number records a match.

The preference circuitry for FBL N includes only an AND gate AN with three inputs AN1, AN2 and AN3. Input signal at AN1 is present when there is a count of 1 in the counter of C N, input signal at AN 3 is present when a match is recorded on comparator N and input signal at AN2 is received from OR (N-1)3 (not shown) in FBL N-1.

The preference circuitry operates as follows:

First case

Assume all stores F1 - FN, B1 - BN etc. are empty. When the first sets of frequency and bearing informations are received they will respectively be stored in all the stores. It is desired to store the information only in store group 1 and this is accomplished as follows:

All store groups record match signals and have a count of 1 in there stores. OR gates OR 21, OR 23, OR 31 etc. provide the third signal input M1 from comparator 1 to AND gates A2 and A3 etc. to reset all the stores in store groups 2, 3 . . . N. Therefore the value is stored only in store group 1 and all other store groups are reset.

Second case

Now assume that store group 2 has recorded several matches and has a count greater than 1 in its counter. Assume that store group 1 has been cleared because, for example its information was redundant, also assume that store group 3 is also free to receive information i.e., its stores are empty.

All three store groups will record the information, and will have match signals. Store groups 1 and 3 will have 1 counts in their counters. Store group 2 will not and therefore its AND gate A2 can not give an output. FBL 1 will obtain its third input, A12 to A1 from OR gate OR22 because OR 222 will have an input from the counter since the counter is greater than 1. Therefore store group 1 is reset.

FBL 3 will receive a third input to A3 on A32 from the match signal on store group 1 via OR 23 and OR 31 or from the store group 2 match signal via OR 31 and store group 3 will therefore be reset.

The following rule can be formulated for FIG. 3. A store group is reset only when a match pulse and a count of 1 is present and if any counter of a lower number has any count at all recorded or when any any counter in a group of a higher number has a count greater than 1.

To each store a digital running averager can be attached which will continuously give the mean value of that parameter over the mean active period. This period can either be a fixed period of time or a fixed count in the counter. Therefore on read out the average value over any give period may be obtained.

It is useful to use this average value to up date the associated store. Thus the match circuit will record a match only when signals are received within the tolerance range each side of the running average value.

What is claimed is:

1. A digital data handling system for use in connection with receiver means adapted for receiving signals from a plurality of transmitters, comprising: means for converting the received signals into parallel output trains of binary digital information representing predetermined parameters of each signal, a plurality of groups of storing units arranged in parallel storing channels connected to respective outputs of said converting means, a plurality of comparing means each assigned to at least one pair of storing units in each group for producing an output signal when the stored digital information in each unit of said pair corresponds to information at corresponding outputs of said converting means, a plurality of counting means assigned to each comparing means and controlled by the output signal therefrom, and a plurality of preference logic circuits each assigned to a pair of storing units for producing a reset signal for said pair when a coincidence of output signals from a corresponding comparing means, from a corresponding counting means and from any of the subsequent and preceeding comparing means, occurs.

2. A digital data handling system as claimed in claim 1 wherein the comparing means includes a pair of subtractors connected between an output of said converting means and a corresponding storing unit, a pair of matching circuits for providing match signals from the output signals of said subtractors, and an "AND" gate having two inputs connected to said matching circuits for producing control output signals for said counting means and for said preference logic circuits.

3. A digital data handling system as claimed in claim 1 wherein each preference logic circuit includes an "AND" gate having a first input connected to the output of a corresponding counting means, a second input connected to respective outputs of comparing means subsequent and preceding storing groups, a third input connected to the output of a corresponding comparing means, and an output connected to a reset line of the assigned pair of storing unit.

4. A digital data handling system as claimed in claim 3 wherein intermediate preference logic circuits in each store channel include respectively, three "OR" gates each having a first input connected to the output of comparing means in a preceeding group and a second input connected to the output of comparing means in the subsequent group, whereby the outputs of said "OR" gates control the inputs of said AND gates.

* * * * *